United States Patent Office 2,945,026
Patented July 12, 1960

2,945,026

16-AMINO-STEROID DERIVATIVES

Paul Gailliot, Paris, and Jean Auguste Robert, Gentilly, France, assignors to Societe des Usines Chimiques Rhone-Poulenc, Paris, France, a French body corporate No Drawing. Filed Jan. 19, 1959, Ser. No. 787,336

Claims priority, application France Jan. 23, 1958

9 Claims. (Cl. 260—239.5)

This invention relates to new steroid derivatives, processes for their preparation and pharmaceutical compositions containing them.

The new steroids of the present invention are the $1\beta:3\beta$-dihydroxy-$16\alpha$-amino-pregn-5-en-20-ones of the planar general formula:

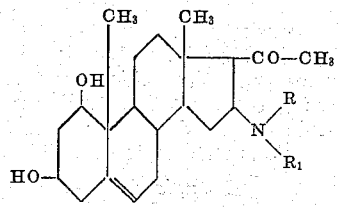

I and their acid addition salts wherein R and $R_1$ are the same or different and represent hydrogen atoms or hydrocarbons groups (such as alkyl, cycloalkyl, cycloalkylalkyl, aryl, or aralkyl groups) which may be substituted by a hydroxyl group, or R and $R_1$ together with the adjacent nitrogen atom form a saturated heterocyclic group which may be substituted by an alkyl, a hydroxy, or hydroxyalkyl group. When the group —$NRR_1$ represents a saturated heterocyclic group it may be for example a pyrrolidino, piperidino, hexamethyleneimino, morpholino, piperazino, 4-alkylpiperazino, hydroxypyrrolidino, hydroxypiperidino, hydroxypiperazino, hydroxyalkylpiperidino, hydroxyalkylpiperazino, hydroxyhexamethyleneimino or hydroxymorpholino group.

The steroid derivatives of Formula I have remarkable pharmacodynamic properties. Some of them are very active coronary dilators, while others are characterised by a marked anabolising action. Preferred products having a coronary dilating action are those which possess in 16-position a pyrrolidino, piperidino, benzylamino or hexylamino residue, and preferred products having an anabolising action are those which possess in 16-position a hydroxypiperidino or hydroxyalkylpiperidino residue.

The compounds of general Formla I are systematically named $1\beta:3\beta$-dihydroxy-$16\alpha$-amino (or -substituted-amino) -pregn-5-en-20-ones in this specification and in the appended claims. The configuration of the 1-hydroxy group of the compounds of the invention is not certain but is probably the $\beta$-configuration proposed by Benn, Colton, and Pappo (J. Amer. Chem. Soc., 79 (1957), 3920) for the ruscogenin and neoruscogenin derivatives from which the products of the present invention are derived. The configuration of the amino group in the 16-position of the pregnane nucleus is also uncertain but the $\alpha$-configuration has been assigned to the products of the invention by analogy with the work of Gould et coll. (J. Amer. Chem. Soc., 78, 3160 (1956)) on $3\beta$-hydroxy-$16\alpha$-amino-pregn-5-en-20-ones.

According to a feature of the present invention the steroid derivatives of general Formula I are prepared by a process which comprises reacting $1\beta:3\beta$-dihydroxypregna-5:16-dien-20-one of the planar formula:

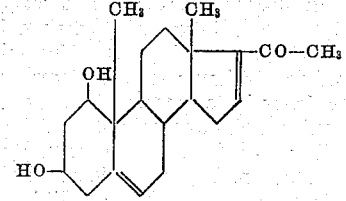

II or a triester of $1\beta:3\beta$-dihydroxy-16-(5-hydroxy-4-methylvaleroyloxy)-pregn-5-en-20-one of the planar formula:

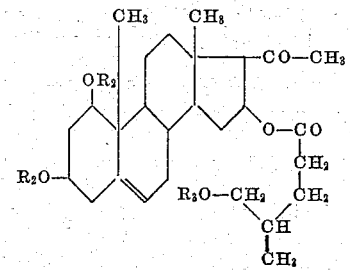

III (wherein $R_2$ and $R_3$ represent lower acyl groups, e.g. acetyl) with an amine of the general formula $HNRR_1$ (wherein R and $R_1$ are as hereinbefore defined), as such or in the form of a salt (especially hydrochloride) thereof.

$1\beta:3\beta$-dihydroxy-pregna-5:16-dien-20-one may be prepared by the action of a strong base on a compound of general Formula III in solution in an aqueous tertiary alcohol or an aqueous cyclic ether. The compounds of general Formula III may be obtained by the oxidative degradation, in the presence of an acid such as acetic acid, of the triesters of pseudo-ruscogenin, themselves obtained by the opening of the F-ring of the ruscogenins extracted from the rhizomes of Butcher's Broom. The reaction is preferably carried out in a solvent medium in the presence of an alkaline catalyst. As catalyst, there may be employed with advantage a compound such as an alkali metal hydroxide, for example sodium or potassium hydroxide, an alkali metal carbonate, for example sodium carbonate or potassium carbonate, an alkali metal amide, such as sodamide, a quaternary ammonium hydroxide, such as benzyltrimethylammonium hydroxide or a resin having a quaternary ammonium function. The solvent may be an inert solvent, such as an aromatic hydrocarbon, for example benzene or toluene, an ether such as dioxan or tetrahydrofuran, or a ketone such as acetone or methylethylketone. It is also possible to employ with advantage as solvent an excess of the amine $HNRR_1$ employed. The reaction may also be carried out in aqueous organic medium containing, for example, an inert organic solvent, the amine $HNRR_1$ and a substantial quantity of water. Instead of the amine $HNRR_1$ there may be employed a salt of this amine, for example its hydrochloride. In this case, the basic catalyst employed will preferably be chosen from the hydroxides of alkali metals, such as sodium hydroxide or potassium hydroxide.

For therapeutic purposes the steroid derivatives of Formula I are employed as the free bases or in the form of acid addition salts, it being understood that only those salts should in practice be employed as contain anions that are relatively innocuous to the animal organism when used in therapeutic doses so that the beneficial physiological properties inherent in the parent compound are not vitiated by side-effects ascribable to those anions. Suitable salts include hydrohalides, for example hydrochlorides, 8-chlorotheophyllinates, phosphates, nitrates, sulphates, maleates, fumarates, citrates, tartrates, methane sulphonates and ethane disulphonates.

The following examples illustrate the invention.

*Example II*

To a solution of 1β:3β-dihydroxy-pregna-5:16-dien-20-one (1 g.) in dioxan (17.5 cc.) is added pyrrolidine (2.5 cc.) and then a solution of potassium hydroxide pellets (0.25 g.) in water (7.5 cc.). The mixture obtained is stirred for 17 hours at room temperature.

The aqueous layer is decanted and extracted with dioxan (2×10 cc.) which is combined with the main organic phase. The combined organic solutions are concentrated under 20 mm. Hg to a volume of about 5 cc. The product is precipitated by the addition of water (100 cc.), and after filtration, washing with water and drying in vacuo over sulphuric acid there is obtained 1β:3β-dihydroxy-16α-1'-pyrrolidyl-pregn-5-en-20-one (1.12 g.), M.P. 120–125° C. after recrystallisation from 75% methanol.

The 1β:3β-dihydroxy-pregna-5:16-dien-20-one employed as starting material can be obtained in accordance with E. B. Hershberg et coll. [J. Amer. Chem. Soc. 79, 4814 (1957)] by degradation of the side chain of ruscogenin, neoruscogenin or a mixture of the two such as that obtained in the extraction of the rhizomes of Butcher's Broom (*Ruscus aculeatus L.*) [Ch. Sannie and H. Lapin, Bull. Soc. Chim. Fr., 1552 and 1556 (1955); Bull. Soc. Chim. Fr., 1237 (1957)].

*Example II*

To a solution of 1β:3β-dihydroxy-pregna-5:16-dien-20-one (6 g.) in dioxan (105 cc.) is added piperidine (15 cc.) and then a solution of potassium hydroxide pellets (1.5 g.) in water (45 cc.). The mixture is allowed to stand for 20 hours at room temperature.

The solvents are driven off in vacuo and the crystallised residue is treated with water (100 cc.), filtered, washed with water and dried at room temperature in vacuo over sulphuric acid. There is thus obtained 7.14 g. of 1β:3β-dihydroxy-16α-1'-piperidyl-pregn-5-en-20-one, M.P. 119–121° C. after crystallisation from 75% methanol.

*Example III*

The procedure of Example II is followed, starting with 1β:3β-dihydroxy-pregna-5:16-dien-20-one (6.46 g.), dioxan (112 cc.), benzylamine (16 cc.), potassium hydroxide pellets (1.6 g.) and water (48 cc.).

There is obtained crude 1β:3β-dihydroxy-16α-benzylamino-pregn-5-en-20-one (7.25 g.); in order to purify it, it is dissolved in acetone (35 cc.) and decolourised with charcoal, and the product is precipitated by the slow addition of hexane (35 cc.).

The pure 1β:3β-dihydroxy-16α-benzylamino-pregn-5-en-20-one (5.25 g.) thus obtained melts at 93–96° C.

*Example IV*

The procedure of Example II is followed, starting with 1β:3β-dihydroxy-pregna-5:16-dien-20-one (6 g.), dioxan (105 cc.), aqueous ethylamine (45 cc. of a 33% solution), potassium hydroxide pellets (1.5 g.) and water (15 cc.).

There is obtained a crude product (6.4 g.), which is purified by dissolving it in N/3 hydrochloric acid (60 cc.). After filtration of the insoluble matter, precipitation of the base by means of N sodium hydroxide (20 cc.), filtration, washing with water and drying in vacuo over sulphuric acid, there is obtained 1β:3β-dihydroxy-16α-ethylamino-pregn-5-en-20-one (5.63 g.), M.P. 108–112° C.

*Example V*

By substituting the piperidine (15 cc.) in Example II by 4-ethylpiperazine (15 cc.), there is obtained after crystallisation of the crude product from methanol, 1β:3β-dihydroxy-16α-(4-ethyl-1-piperazinyl)-pregn-5-en-20-one (5.3 g.), M.P. 185–190° C., of which the dihydrochloride, prepared in methanol by the addition of ethereal hydrogen chloride, melts at 280–285° C. with decomposition.

*Example VI*

A mixture of 1β:3β-dihydroxy-16-(5-hydroxy-4-methylvaleroyloxy)-pregn-5-en-20-one triacetate (8.25 g.), dioxan (240 cc.), piperidine (16 cc.), potassium hydroxide pellets (6.6 g.) and water (132 cc.) is heated for 2 hours on the water bath and then allowed to stand for 64 hours at room temperature.

The solvents are driven off in vacuo until a volume of about 25 cc. remains, and the residue is taken up in water (200 cc.), filtered and washed with water. The crude product thus obtained is purified by dissolving it in 0.2 N hydrochloric acid (150 cc.). After filtration of the insoluble matter and decoloration with charcoal of the aqueous hydrochloride solution, the base is precipitated by N sodium hydroxide (35 cc.). The product is filtered, washed with water and dried in vacuo over sulphuric acid. There is thus obtained 1β:3β-dihydroxy-16α-1'-piperidyl-pregn-5-en-20-one (5 g.), which is identical to the product obtained in Example II, the hydrochloride of which melts at about 220–223° C.

The initial tri-acetate can be prepared by the process employed by H. Lapin [Bull. Soc. Chim. Fr., 1501 (1957)] which consists of an oxidation, by means of a mixture of chromic anhydride and acetic acid, of the tri-esters of pseudo-ruscogenins, which are themselves obtained by opening (by the known methods) the F-ring of the ruscogenins extracted from rhizomes of Butcher's Broom [Ch. Sannie and H. Lapin, loc. cit.].

*Example VII*

The procedure of Example VI is followed, starting with 1β:3β-dihydroxy-16-(5-hydroxy-4-methylvaleroyloxy)-pregn-5-en-20-one triacetate (17.4 g.), dioxan (291 cc.), N-2'-hydroxyethylpiperazine (24 cc.), potassium hydroxide pellets (9.9 g.) and water (198 cc.). There is obtained 1β:3β-dihydroxy-16α-(4-2'-hydroxyethyl-1-piperazinyl)-pregn-5-en-20-one (9 g.), of which the hydrochloride, prepared in methanol by the addition of ethereal hydrochloric acid, melts at 256–258° C.

*Example VIII*

The procedure of Example VI is followed, starting with 1β:3β-dihydroxy-16-(5-hydroxy-4-methylvaleroyloxy)-pregn-5-en-20-one triacetate (17.4 g.), dioxan (291 cc.), 4-hydroxymethylpiperidine (21 g.), potassium hydroxide pellets (9.9 g.) and water (198 cc.). There is obtained 1β:3β-dihydroxy-16α-(4-hydroxymethyl-1-piperidyl)-pregn-5-en-20-one (6.15 g.), of which the hydrochloride, prepared in methanol by the addition of ethereal hydrochloric acid, melts at 246–249° C.

*Example IX*

To a solution of 1β:3β-dihydroxy-pregna-5:16-dien-20-one (30 g.) in dioxan (525 cc.) are added N-ethylethanolamine (75 cc.) and then a solution of potassium hydroxide pellets (7.5 g.) in water (225 cc.). The product is allowed to stand for 45 hours at room temperature.

The solvents are driven off in vacuo. The residue is dissolved in a minimum of acetone and the solution obtained is poured with stirring into N hydrochloric acid (1 litre). The insoluble matter is filtered off, the aqueous hydrochloride solution is decolourised with charcoal and the base is precipitated in the presence of ether (1 litre) by a slight excess of sodium hydroxide solution ($d$=1.33). After stirring, the ethereal layer is decanted and the aqueous layer is again extracted with ether (3×700 cc.). The ethereal extracts are washed with water and dried over sodium sulphate. After distillation of the ether, there is obtained 1β:3β-dihydroxy-16α-(N-ethyl-N-2-hydroxy-ethylamino)-pregn-5-en-20-one, of which the hydrochloride, prepared in isopropanol by the addition of ethereal hydrochloric acid, melts at 261–262° C.

Example X

The procedure of Example VI is followed, starting with 17.4 g. of 1β:3β-dihydroxy-16-(5-hydroxy-4-methylvaleroyloxy)-pregn-5-en-20-one triacetate (17.4 g.), dioxan (291 cc.), ethanolamine (24 cc.), potassium hydroxide pellets (9.9 g.) and water (198 cc.). There is obtained 1β:3β-dihydroxy-16α-(2-hydroxyethylamino)-pregn-5-en-20-one (5.1 g.), of which the hydrochloride, prepared in methanol by the addition of ethereal hydrochloric acid, melts at 300–302° C. with decomposition.

Example XI

A mixture of 1β:3β-dihydroxy-pregna-5:16-dien-20-one (9.9 g.), 2-methyl-6-amino-heptan-2-ol hydrochloride (31 g.), dioxan (175 cc.), potassium hydroxide pellets (12.58 g.) and water (75 cc.) is agitated for 48 hours at room temperature. The solvents are driven off in vacuo and the residue is taken up in water (500 cc.). An oil which precipitates is separated by decanting and dissolved in acetone (30 cc.) on the water bath. The acetone solution obtained is poured with agitation into 0.5 N hydrochloric acid (200 cc.). The insoluble matter is filtered off, washed with 0.5 N hydrochloric acid (50 cc.) and then with water (2×100 cc.). The combined hydrochloric acid solutions and washing liquors are decolourised with charcoal and then made alkaline with caustic soda solution ($d=1.33$) (20 cc.). The oily base which precipitates is extracted with ether (4×250 cc.). The ethereal extracts are washed with water and dried over sodium sulphate. After distillation of the ether, there is obtained 1β:3β-dihydroxy-16α-5-hydroxy-1:5-dimethyl-n-hexylamino)-pregn-5-en-20-one (4.4 g.), of which the acid oxalate, prepared in ethanol by the addition of crystalline oxalic acid, melts at 231–233° C.

Example XII

The procedure of Example VI is followed, starting with 11.6 g. of 1β:3β-dihydroxy-16-(5-hydroxy-4-methylvaleroyloxy)-pregn-5-en-20-one triacetate (11.6 g.), dioxan (194 cc.), aqueous dimethylamine (40 cc. of a 40% solution), potassium hydroxide pellets (6.6 g) and water (108 cc.). There is obtained crude 1β:3β-dihydroxy-16α-dimethylamino-pregn-5-en-20-one (4.3 g.), melting at 172–176° C., of which the hydrochloride, prepared in methanol by the addition of ethereal hydrochloric acid, melts at 260–265° C. with decomposition.

Example XIII

The exact procedure of Example VI is followed, starting with 1β:3β-dihydroxy-16-(5-hydroxy-4-methylvaleroyloxy)-pregnen-5-en-20-one triacetate (11.6 g.), dioxan (194 cc.), morpholine (16 cc.), potassium hydroxide pellets (6.6 g.) and water (132 cc.). There is obtained 1β:3β-dihydroxy-16α-morpholino-pregn-5-en-20-one (4.8 g.), of which the hydrochloride, prepared in methanol by the addition of an ethereal solution of hydrochloric acid, melts at 235–240° C.

Example XIV

By proceeding as in Example VI, starting with 1β:3β-dihydroxy-16(5-hydroxy-4-methylvaleroyloxy)-pregn-5-en-20-one triacetate (17.4 g.), dioxan (291 cc.), aqueous methylamine (60 cc. of a 27.6% solution), potassium hydroxide pellets (9.9 g.) and water (155 cc.), there is obtained 1β:3β-dihydroxy-16α-methylamino-pregn-5-en-20-one (6.8 g.) melting at 205–207° C., of which the hydrochloride, prepared in isopropanol by the addition of ethereal hydrochloric acid, melts with decomposition at 315–320° C.

Example XV

By proceeding as in Example VI, starting with 1β:3β-dihydroxy-16-(5-hydroxy-4-methylvaleroyloxy)-pregn-5-en-20-one triacetate (11.6 g.), dioxan (194 cc.), cyclohexylamine (16 cc.), potassium hydroxide pellets (6.6 g.) and water (132 cc.), there is obtained 1β:3β-dihydroxy-16α-cyclohexylamino-pregn-5-en-20-one (4.2 g.), of which the hydrochloride, prepared in isopropanol by the addition of ethereal hydrochloric acid, melts with decomposition at 317°  C.

Example XVI

By proceeding as in Example VI, starting with 1β:3β-dihydroxy-16-(5-hydroxy-4-methylvaleroyloxy)-pregn-5-en-20-one triacetate (17.4 g.), dioxan (291 cc.), n-propylamine (24 cc.), potassium hydroxide pellets (9.9 g.) and water (198 cc.), there is obtained 1β:3β-dihydroxy-16α-n-propylamino-pregn-5-en-20-one (5 g.), of which the hydrochloride, prepared in isopropanol by the addition of ethereal hydrochloric acid, melts with decomposition at about 290° C.

Example XVII

A mixture of 1β:3β-dihydroxy-pregna-5:16-dien-20-one (9.9 g.), dioxan (175 cc.), n-hexylamine (25 cc.), potassium hydroxide pellets (2.5 g.) and water (75 cc.) is agitated for 74 hours at room temperature. The solvents are driven off in vacuo and the semi-crystallised residue is washed on a filter with water (5×100 cc.). The filter cake is dissolved in acetone (50 cc.) and the solution obtained is poured into 0.5 N hydrochloric acid (200 cc.). The insoluble matter is filtered off, the aqueous hydrochloric acid solution is decolourised with charcoal and it is then made alkaline with sodium hydroxide solution ($d=1.33$) (35 cc.). The base is filtered off, washed with water and dried, when there is obtained 1β:3β-dihydroxy-16α-n-hexylamino-pregn-5-en-20-one (4.3 g.), of which the hydrochloride, prepared in methanol by the addition of ethereal hydrochloric acid, melts at 265° C.

Example XVIII

To a solution of 1β:3β-dihydroxy-pregna-5:16-dien-20-one (10 g.) in dioxan (175 cc.) is added 3-hydroxymethylpiperidine (21 g.) and then a solution of potassium hydroxide (2.5 g.) in water (75 cc.). The mixture is allowed to stand for 64 hours at room temperature.

The solvents are driven off in vacuo and the residue is taken up with 200 cc. of water. The insoluble gummy mass is triturated with 0.5 N hydrochloric acid (300 cc. in 2 lots). The remains an insoluble residue, which is filtered off. The hydrochloric acid solution is decolourised with charcoal and then slowly made alkaline with stirring with sodium hydroxide solution ($d=1.33$) (18 cc.). The base is filtered off, washed with water and dried, when there is obtained 1β:3β-dihydroxy-16α-(3-hydroxymethyl-1-piperidyl)-pregn-5-en-20-one (7.7 g.), of which the hydrochloride, prepared in acetone containing 10% of ethanol by addition to ethereal hydrochloric acid, melts with decomposition at 242–246° C.

Example XIX

The procedure of Example XVIII is followed, starting with 1β:3β-dihydroxy-pregna-5:16-dien-20-one (9 g.), dioxan (157 cc.), racemic 3-hydroxypiperidine (21 g.), potassium hydroxide (2.25 g.) and water (67.5 cc.).

There is obtained a mixture (7.5 g.) of the two diastereoisomeric forms of 1β:3β-dihydroxy-16α-(3-hydroxy-1-piperidyl)-pregn-5-en-20-one. These two diastereoisomeric forms differ by the configuration of the asymmetric carbon having hydroxyl attached in the piperidine nucleus. On fractional crystallisation of the mixture from methylethylketone and isopropanol, both forms are isolated, melting at 196–197° C. and 199–200° C. respectively.

Example XX

The procedure of Example XVIII is followed, starting with 1β:3β-dihydroxy-pregna-5:16-dien-20-one (5 g.), dioxan (87.5 cc.), 4-(3-hydroxypropyl)-piperidine hydrochloride (13 g.), potassium hydroxide (5.28 g.) and water (37.5 cc.), with stirring for 66 hours at room temperature.

There is obtained 1β:3β-dihydroxy-16α-[4-(3-hydroxypropyl)-1-piperidyl]-pregn-5-en-20-one (5.3 g), which melts at 150–154° C. and resolidifies and remelts at about 195° C.

*Example XXI*

The procedure of Example XVIII is followed, starting with 1β:3β-dihydroxy-pregna-5:16-dien-20-one (5 g.), dioxan (87.5 cc.), racemic 3-(3-hydroxypropyl)-piperidine (10 g.), potassium hydroxide (1.25 g.) and water (37.5 cc.), with stirring for 64 hours at room temperature.

There is obtained a mixture (5.5 g.) of the two diastereoisomeric forms of 1β:3β-dihydroxy-16α-[3-(3-hydroxypropyl)-1-piperidyl]-pregn-5-en-20-one which, after recrystallisation from 50% aqueous methanol, melts in pasty form from 125° C. and melts completely at about 160° C.

The present invention includes within its scope pharmaceutical compositions comprising one or more of the compounds of Formula I, or an acid addition salt thereof, and a significant amount of a pharmaceutical carrier which may be either a solid material or a liquid. In clinical practice the compounds of the present invention will normally be administered orally, in consequence of which the preferred formulations are those of the kind suitable for oral administration.

Preparations for oral ingestion can be liquids or solids or any combination of these forms, such as solutions, suspensions, syrups, elixirs, emulsions, powders or tablets. Pharmaceutical preparations for administration of the active therapeutic agents in unit dose form can take the form of compressed powders (or tablets) or of a powder enclosed in a suitable capsule of absorbable material such as gelatin. These compressed powders (or tablets) can take the form of the active materials admixed with suitable excipients and/or diluents such as starch, lactose, stearic acid, magnesium stearate or dextrin.

In yet a further embodiment, the active material may, as such or in the form of a diluted composition, be put up in powder packets and employed as such.

Preparations for parenteral administration may be sterile solutions or suspensions in water or other liquids, with or without the addition of soluble or insoluble diluents and/or solid or liquid excipients.

The percentage of active ingredient in the compositions of the invention may be varied, it being necessary that it should constitute a proportion such that a suitable dosage shall be obtained. Obviously several unit dosage forms may be administered at about the same time.

We claim:

1. A member of the class consisting of 1β:3β-dihydroxy-16α-1'-pyrrolidyl-pregn-5-en-20-one and its acid addition salts.

2. A member of the class consisting of 1β:3β-dihydroxy-16α-1'-piperidyl-pregn-5-en-20-one and its acid addition salts.

3. A member of the class consisting of 1β:3β-dihydroxy-16α-benzylamino-pregn-5-en-20-one and its acid addition salts.

4. A member of the class consisting of 1β:3β-dihydroxy-16α-(4-hydroxymethyl-1-piperidyl)-pregn-5-en-20-one and its acid addition salts.

5. A member of the class consisting of 1β:3β-dihydroxy-16α-n-hexylamino-pregn-5-en-20-one and its acid addition salts.

6. A member of the class consisting of 1β:3β-dihydroxy-16α-(3-hydroxymethyl-1-piperidyl)-pregn-5-en-20-one and its acid addition salts.

7. A member of the class consisting of 1β:3β-dihydroxy-16α-[4-(3-hydroxypropyl)-1-piperidyl]-pregn-5-en-20-one and its acid addition salts.

8. A member of the class consisting of 1β:3β-dihydroxy-16α-[3-(3-hydroxypropyl)-1-piperidyl]-pregn-5-en-20-one and its acid addition salts.

9. A member of the class consisting of 1β:3β-dihydroxy-16α-amino-pregn-5-en-20-ones of the planar general formula:

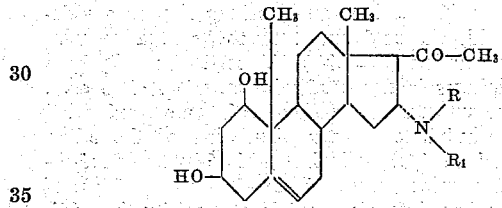

and their acid addition salts, wherein the grouping

is selected from the class consisting of monoalkylamino, dialkylamino, mono (hydroxyalkyl) amino and N-alkyl-N-hydroxyalkyl amino in each of which the alkyl residues contain at most 8 carbon atoms; aralkylamino containing at most 8 carbon atoms; pyrrolidino, piperidino, morpholino, piperazino, alkylpiperazino groups in which the alkyl group contains up to 4 carbon atoms, the said groups containing hydroxy substituents and the said groups containing hydroxyalkyl substituents in which the alkyl residue contains up to 4 carbon atoms.

No references cited.